(12) United States Patent
Engebretsen

(10) Patent No.: US 7,523,081 B1
(45) Date of Patent: Apr. 21, 2009

(54) METHOD AND APPARATUS FOR PRODUCING A SIGNATURE FOR AN OBJECT

(75) Inventor: Lars Engebretsen, Zurich (CH)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 11/387,265

(22) Filed: Mar. 22, 2006

(51) Int. Cl.
*G06F 17/00* (2006.01)
*G06N 5/00* (2006.01)

(52) U.S. Cl. .............................. 706/45; 706/46; 706/14

(58) Field of Classification Search .................... 706/45, 706/46, 14
See application file for complete search history.

(56) References Cited

OTHER PUBLICATIONS

Moses S. Charikar, Similarity techniques from Rounding Algorithms, 2002, ACM, 1-58113-495-9/02, 380-388.*
Andrei Z. Broder, On the resmblance and containment of documents, 1997, IEEE, Computer Society, 21-29.*
Andrei Z. Broder, Identitying and Filtering Near-Duplicate Documents, 1998, Proc. FUN, 1-8.*

* cited by examiner

*Primary Examiner*—Joseph P Hirl
(74) *Attorney, Agent, or Firm*—Park, Vaughan & Fleming LLP

(57) ABSTRACT

One embodiment of the present invention provides a system that produces an object signature for an object, wherein the object comprises a set of features. During operation, the system first initializes a k-dimensional state vector $\{s_1, s_2, \ldots, s_k\}$ containing floating-point numbers. Next, for each occurrence of each feature in the object, the system (1) computes a random-number seed from the feature; (2) generates k pseudo-random floating-point numbers $\{X_1, X_2, \ldots, X_k\}$ using the random-number seed, wherein each $X_i(i\epsilon[1, k])$ is generated in accordance with an α-stable distribution, wherein $1 \leq \alpha < 2$; and (3) updates each floating-point number $s_i$ in the k-dimensional state vector using an associated pseudo-random floating-point number $X_i$. The system then produces the object signature for the object by condensing the k-dimensional state vector. Note that using an α-stable distribution with $1 \leq \alpha < 2$ to generate the k pseudo-random floating-point numbers for each feature reduces the influence of multiple occurrences of a given feature on the object signature.

24 Claims, 3 Drawing Sheets

METHOD AND APPARATUS FOR PRODUCING A SIGNATURE FOR AN OBJECT

BACKGROUND

1. Field of the Invention

The present invention relates to techniques for estimating similarity between complex objects. More specifically, the present invention relates to a method and an apparatus that estimates similarity between complex objects by comparing object signatures for the complex objects.

2. Related Art

Data explosion in the information age is demanding an increasing number of computing applications to routinely process huge amounts of input data. For example, search engines on the Internet must comb through the billions of web pages that are presently accessible through the Internet and obtain relevant results within a fraction of a second. Traditionally, the computational approaches used by these applications assume that entire data objects can be stored in main memory while the data objects are being processed. However, it is unrealistic to keep all of the data objects in the main memory when applications are dealing with large numbers of "massive" data objects, such as data objects from a genome database, multimedia files, or web page repositories.

The tremendous burden created by these massive data objects has led to the development of computing techniques that can process such data objects more efficiently. In particular, people have developed "streaming" techniques which operate by streaming individual elements in a data object sequentially through the processor and the memory, thereby reducing memory storage requirements at any given time. Furthermore, while streaming the data object, these streaming techniques can construct an object signature for the data object that captures relevant features of the elements in the data object, while occupying significantly less space than the original data object. These object signatures are useful because many operations on the original data objects (such as comparisons) can be performed more efficiently on the object signatures with significantly reduced memory and computational requirements. Moreover, these object signatures can be stored using very little space for future reuse.

Charikar has applied the object signature technique to estimate the similarity between arbitrarily complex objects (see Moses S. Charikar, "Similarity Estimation Techniques from Rounding Algorithms," Proceedings of the 34th Annual ACM Symposium on Theory of Computing, 2002). Specifically, Charikar's model first computes an object signature for an object in a streaming manner, such that the elements of the object are fed one-by-one through the model, while maintaining an internal state for the object. More specifically, the model applies a hashing operation to each of the elements in the object, and the hashed value of the element is used to update the internal state for the object. When all elements of the object have been processed, the model uses the final internal state to compute a signature for the object. Note that the internal state for the object requires only a small amount of space, which in practice is independent of the size of the object.

Unfortunately, Charikar's model has a drawback. Specifically, while generating the object signature, Charikar's model tends to overemphasize the influence of multiple occurrences of an identical feature in an object. In other words, when the same feature occurs multiple times in the object, the influence of that feature on the resulting object signature increases dramatically, thereby degrading the utility of the object signature for many types of operations, such as comparisons.

Hence, what is needed is a method and an apparatus for generating an object signature for an object without the above-described problems.

SUMMARY

One embodiment of the present invention provides a system that produces an object signature for an object, wherein the object comprises a set of features. During operation, the system first initializes a k-dimensional state vector $\{s_1, s_2, \ldots, s_k\}$ containing floating-point numbers. Next, for each occurrence of each feature in the object, the system (1) computes a random-number seed from the feature; (2) generates k pseudo-random floating-point numbers $\{X_1, X_2, \ldots, X_k\}$ using the random-number seed, wherein each $X_i(i \in [1, k])$ is generated in accordance with an α-stable distribution, wherein $1 \leq \alpha < 2$; and (3) updates each floating-point number $s_i$ in the k-dimensional state vector using an associated pseudo-random floating-point number $X_i$. The system then produces the object signature for the object by condensing the k-dimensional state vector. Note that using an α-stable distribution with $1 \leq \alpha < 2$ to generate the k pseudo-random floating-point numbers for each feature reduces the influence of multiple occurrences of a given feature on the object signature.

In a variation on this embodiment, the system initializes the k-dimensional state vector by setting each $s_i$ to zero.

In a variation on this embodiment, the system computes the random-number seed from the feature by hashing the feature to produce the random-number seed.

In a variation on this embodiment, the system generates the k pseudo-random floating-point numbers by: (1) seeding a pseudo-random number generator (PRNG) with the random-number seed; and (2) generating the k pseudo-random floating-point numbers from the PRNG.

In a variation on this embodiment, the α-stable distribution is a Cauchy distribution, wherein $\alpha = 1$.

In a variation on this embodiment, the system updates each floating-point number $s_i$ in the k-dimensional state vector using an associated pseudo-random floating-point number $X_i$ by: (1) multiplying each $X_i$ with a predetermined feature weight w, wherein w is associated with the feature; and (2) adding the weighted $X_i$ to $s_i$, such that $s_i \leftarrow s_i + wX_i$.

In a variation on this embodiment, the system produces the object signature for the object by condensing the k-dimensional state vector into a k-bit object signature.

In a further variation on this embodiment, the system condenses the k-dimensional state vector into a k-bit object signature by converting each floating-point number $s_i$ into a single bit $f_{si}$ within the k-bit object signature such that: (1) if $s_i < 0$, $f_{si}$ is set to 0; and (2) if $s_i \geq 0$, $f_{si}$ is set to 1.

In a variation on this embodiment, the system compares the object signatures for a first object and a second object to estimate the similarity between the first object and the second object.

DETAILED DESCRIPTION

Figure 1:
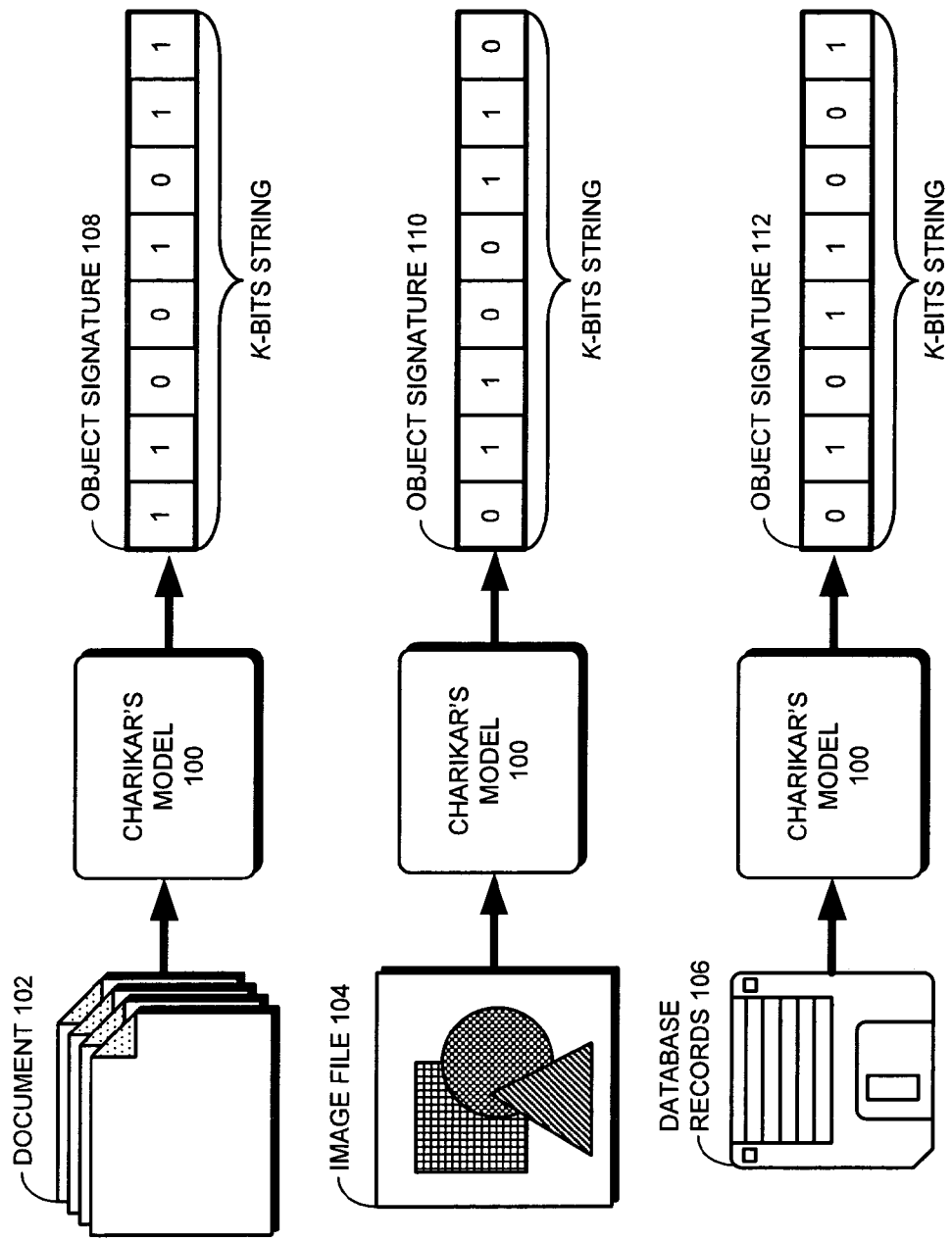
FIG. 1 illustrates exemplary processes for producing object signatures for different objects using Charikar's model.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Charikar's Model and Object Signature

Charikar's model implements a "proximity-aware" hash function when condensing arbitrary weighted objects into associated object signatures. In other words, the hash function used by Charikar possesses a property that for two objects that are correlated with each other, the corresponding object signatures are also correlated. In particular, the correlation between the two object signatures which are both bit-strings, is measured by the fraction of bit positions that agree. Hence, if the two objects are strongly correlated, their corresponding bit-strings will have a large overlap. Typically, the degree of correlation is normalized by computing a ratio of the magnitude of the intersection between two unweighted objects to the magnitude of the union of the two unweighted objects. This ratio is a number between zero and one, wherein completely uncorrelated objects give rise to a value of zero, whereas two identical objects give rise to a value of one.

Generally, Charikar's model maintains a k-dimensional state vector for each object, wherein each object comprises a set of features and wherein k is a predetermined constant. This state vector is generally initialized before starting to compute the object signature of a new object. During operation, the process first computes an ordinary 32-bit hash of each feature in the object. This hash value is used to seed a pseudo-random number generator (PRNG). The PRNG is configured to generate pseudorandom numbers in accordance with a Gaussian distribution with mean of zero and variance of one (i.e., N(0, 1) distribution). Next, the model draws k pseudo-random numbers from the PRNG, wherein each of the pseudo-random number is a N(0,1) random variable. These pseudo-random numbers are then used to update the state vector. Finally, when all features in the object have been processed, the contents of the state vector are used to construct the object signature for the object, which is a string of k bits.

FIG. 1 illustrates exemplary processes for producing object signatures for different objects using Charikar's model. Note that Charikar's model 100 is used to generate object signatures for three different types of objects: a document 102, an image file 104, and database records 106. Charikar's model generates distinct object signatures 108, 110, and 112 for objects 102, 104, and 106 respectively, wherein all the object signatures are k-bit strings. Note that obtaining an object signature for an object involves taking into account the influence from each features in the object as well as repetitive occurrences of each feature in the object.

Process of Producing an Object Signature for an Object

Figure 2:
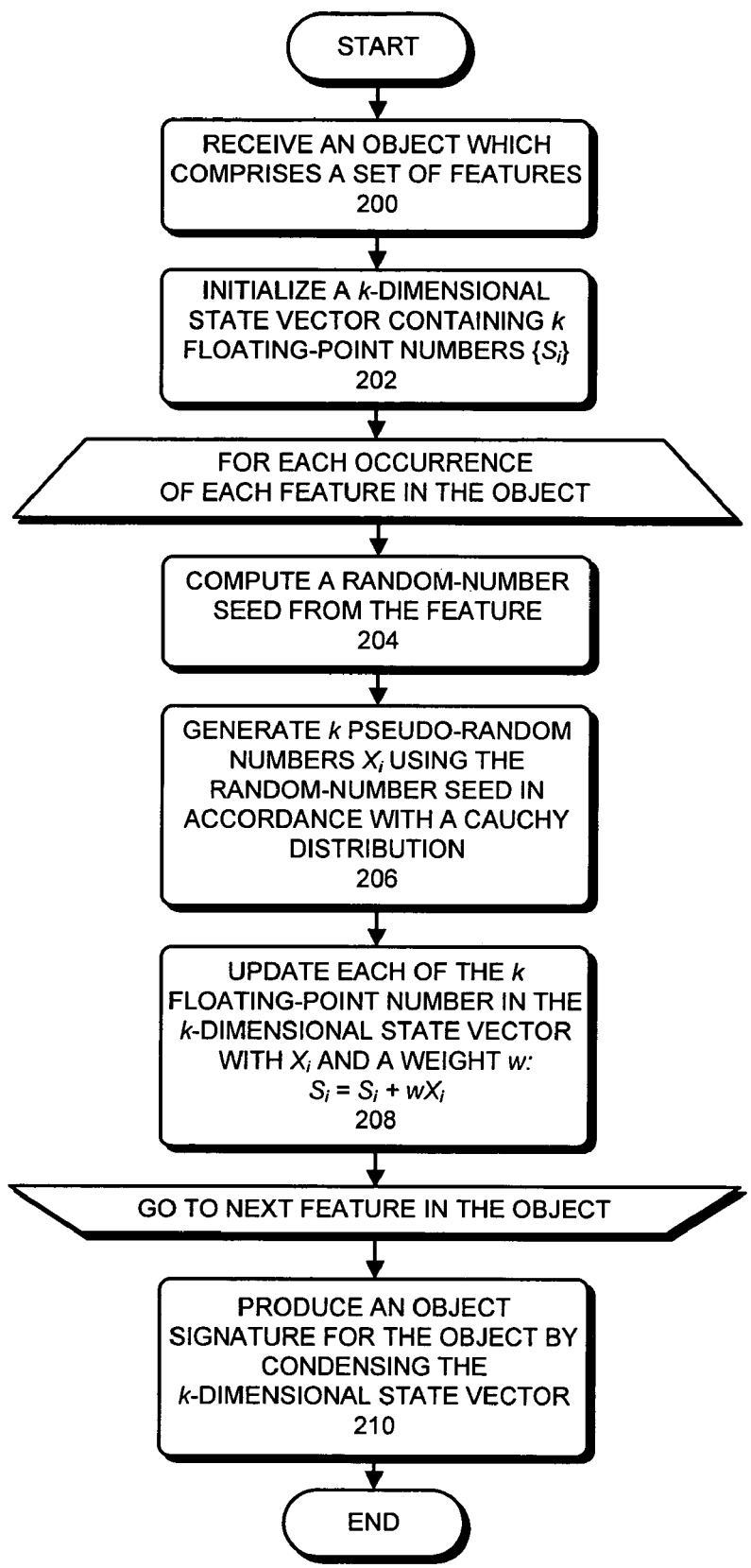
FIG. 2 presents a flowchart illustrating the process of producing an object signature for an object in accordance with an embodiment of the present invention.

FIG. 2 presents a flowchart illustrating the process of producing an object signature for an object in accordance with an embodiment of the present invention. Note that the object discussed herein can include but is not limited to: documents, database records and images.

During operation, the system starts by receiving an object, for example, a text document (step 200). Each object comprises a set of features. For example, a text document can contain features such as terms and bi-grams, while an image file can contain features such as pixel elements or tiles. Typically, a more complex object comprises a larger number of features than a less complex object. For example, a hundred-page text document generally contain more terms than a ten-page document.

The system next initializes a k-dimensional state vector $s=\{s_1, s_2, \ldots, s_k\}$ for the object, wherein each term $s_i$ of the state vector is a floating-point number (step 202). In one embodiment of the present invention, the system initializes the k-dimensional state vector by setting each term $s_i$ to zero. Note that the system can also initialize each term $s_i$ of the k-dimensional state vector to an initial value other than zero.

Next, the system computes a random-number seed from a feature in the set of features comprising the object (step 204). Specifically, the system applies a hash function on the feature, which generates a hash value or seed number associated with the feature, wherein the hash function is configured to generate independent, renormalized and distinct hash values for different features. In one embodiment of the present invention, the hash function is a collision-free hash function.

Note that each unique feature of the object can appear in the object multiple times. For example, if we process a hockey game-related text document in terms of bi-grams, the phrase "power play" is likely to occur more than once in the document. The system will process each occurrence of the same feature equally. Also note that, for multiple occurrences of the same feature, the system generates the same random-number seed using the hash function.

The system then generates k pseudo-random numbers $\{X_1, X_2, \ldots, X_k\}$ using the random-number seed, wherein each number $X_i$ is a floating-point number (step 206). Specifically, the system seeds a pseudo-random number generator (PRNG) with the random-number seed computed from the feature and draws k pseudo-random numbers from the PRNG. Note that, for the multiple occurrences of the same feature, the system will always generate an identical set of the k pseudo-random numbers, due to that fact that they are drawn using the same seed for the PRNG.

Note that the PRNG is configured to generate each of the pseudo-random numbers $X_i$ in accordance with an α-stable distribution, wherein $1 \leq \alpha < 2$. An α-stable distribution has the property that the sum of independent α-stable distributed random variables is still an α-stable distributed random variable. In one embodiment of the present invention, the system configures the PRNG in accordance with a Cauchy distribution with α=1. The Cauchy distribution is characterized with a median of 0, and a half-width at half-maximum (HWHM) of 1. Note that the mean and variance of the Cauchy distribution are undefined. Also note that the original Charikar's model uses a Gaussian (normal) distribution which is a 2-stable distribution, i.e., $\alpha=2$. We will discuss this difference in more details below.

Next, the system updates each term $s_i$ in the k-dimensional state vector using an associated pseudo-random number $X_i$, (step 208). Specifically, the system first multiplies each $X_i$ with a predetermined feature weight w, wherein weight w is a user-provided weight associated with the feature. Next, the system adds the weighted pseudo-random number $X_i$ to term $s_i$ such that: $s_i \leftarrow s_i + wX_i$.

The system repeats steps 204-208 for each occurrence of each feature of the object. In one embodiment of the present invention, the system processes the object in a streaming manner, such that elements of the object are processed sequentially. In each repetition of steps 204-208, the influence of each element in the object is aggregated into the value of $s_i$. At the end of the process, $s_i$ contains the influences from all the features contained in the object. Moreover, this process spreads out the influence of each feature across all k terms of the k-dimensional state vector.

Note that for each new occurrence of the same feature, the addition step 208 reinforces the influence from that feature.

Finally, when the entire object has been processed, the system produces the object signature for the object by condensing the k-dimensional state vector (step 210). In one embodiment of the present invention, the system condenses the k-dimensional state vector to a k-bit object signature. Specifically, the system converts each floating-point number $s_i$ into a single bit $f_{si}$ such that if $s_i<0$, $f_{si}$ is set to 0; if $s_i>0$, $f_{si}$ is set to 1. Note that the representation of object signatures from the k-dimensional state vectors is not limited to the k-bit string. For example, one can choose to convert each floating-point number $s_i$ in the state vector to two or more bits, thereby achieving higher resolution in object signature.

The k-bit object signature of the object can now replace the original object so that various operations on the original object can be performed more efficiently on the bit-string. For example, one can compute a correlation between object signatures for two objects to estimate the similarity between the two objects. Specifically, computing the similarity between two bit-strings involves computing the Hamming distance between the two. As another example, when we need to find objects that are similar to a given object, we first compute the object signatures for these objects and compare them with the object signature of the given object. As yet another example, we can classify a set of objects into classes of similar objects by classifying the corresponding object signatures of the objects.

Typically, a larger k number offers more positions in the object signatures for comparison purpose, which means higher resolution. However, it would demand more memory usage and longer computation time. Typically, k is chosen to be 64 or 128.

Gaussian (Normal) Distribution vs. Cauchy Distribution

Note that the entries in the state vector are sums of independent random variables with an identical distribution. Also note that a sum of two independent random variables having an $\alpha$-stable distribution with index $\alpha$ is still $\alpha$-stable with the same index $\alpha$. Specifically, a Gaussian distribution is a 2-stable distribution, which means that for two normally distributed random variables X and Y with mean of zero, and standard deviations $\sigma$ and $\tau$, the sum of the two X+Y is still a Gaussian distribution. However, the new Gaussian distribution has a standard deviation of $\sqrt{\sigma^2+\tau^2}$, which does not scale linearly with each individual random variable. Because the influence of multiple occurrences of a feature in the object signature should scale linearly with the number of the occurrences during the addition operation (step 208), it is desirable to obtain a resulting distribution from the addition operation that behaves as a linear function of the addition components.

A Cauchy distribution is 1-stable distribution, which means that for two Cauchy distributed random variables X and Y with mean of zero, the sum X+Y is still Cauchy distributed as 2x. Hence, a new Cauchy distribution resulted from an addition operation scales linearly with each addition of another independent Cauchy distribution. In other words, when we add multiple independent Cauchy distributions and take the average, the mean distribution does not obey the law of large numbers, and does not have an expectation. Consequently, by replacing the Gaussian distribution in the original Charikar's model with the Cauchy distribution for the random-number generation (step 206), the influence of multiple occurrences of a same feature on the object signature can be reduced. Furthermore, instead of Cauchy distribution, using an $\alpha$-stable distribution with $\alpha$ somewhere between one and two can also improve the object signature accuracy in comparison to using the Gaussian distribution.

Performance Evaluation

In order to compare the performance for using either a Gaussian distribution or a Cauchy distribution, a text document is used as the test object, wherein the sequence of words in the text document is denoted as S for simplicity. Next, the text document is modified, wherein the sequence of words in the modified text document is denoted as S'. The object signatures for both S and S' are then produced using the same process as above-described. Finally, the similarity between S and S' is computed based on the Hamming distance between associated object signatures. FIG. 3 illustrates the results of comparing the performances between using the Cauchy distribution and the Gaussian distribution for similarity estimation of the two text documents S and S' in accordance with an embodiment of the present invention.

Figure 3A:
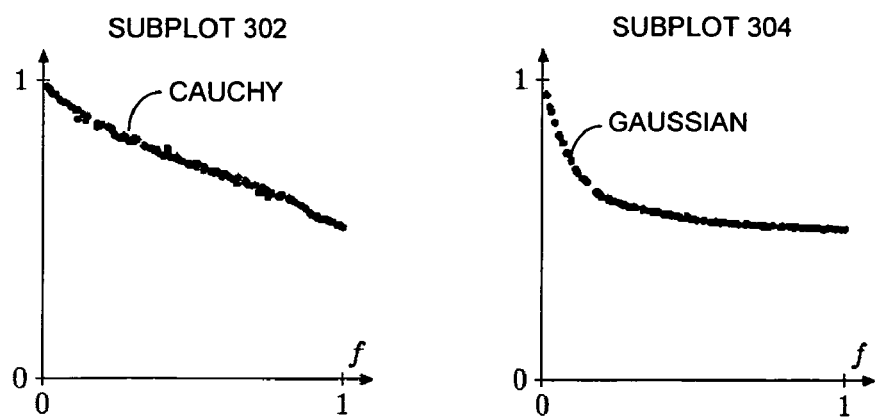
FIG. 3A illustrates the similarity estimation results for S and S', wherein S' is obtained by replacing a fraction of the text document S with an identical term in accordance with an embodiment of the present invention.

FIG. 3A illustrates the similarity estimation results for S and S', wherein S' is obtained by replacing a fraction of the text document S with an identical term in accordance with an embodiment of the present invention.

Specifically, S' is generated from S by replacing a fraction f of positions in the set S with a same term "4711", which simulates the effect of multiple occurrences of a same feature. Subplot 302 illustrates the result from using Cauchy distribution; while subplot 304 illustrates the result from the Gaussian approach. Using Cauchy distribution, the result in subplot 302 demonstrates a linear decrease in similarity in response to the increasing fraction of difference f from zero to one, which is as expected. In contrast, using Gaussian distribution, the result in subplot 304 demonstrates a highly nonlinear decrease in similarity with a linear increase of the fraction f. Hence, using Cauchy distribution improves the performance in this case.

Figure 3B:
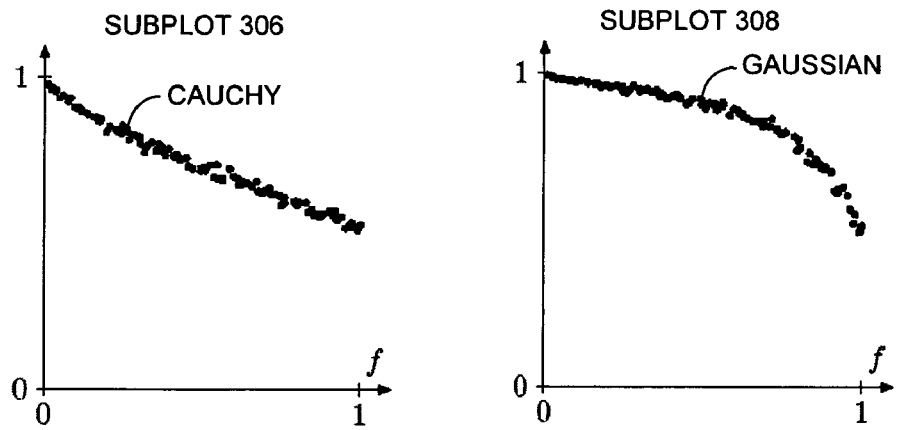
FIG. 3B illustrates the similarity estimation results for S and S', wherein S' is obtained by replacing a fraction of S with new, unique terms in accordance with an embodiment of the present invention.

FIG. 3B illustrates the similarity estimation results for S and S', wherein S' is obtained by replacing a fraction of S with new, unique terms in accordance with an embodiment of the present invention. Specifically, S' is generated from S by replacing a fraction f of positions in the set S with new, unique terms, therefore the two sets are different in the fraction f. Subplot 306 illustrates the result from using Cauchy distribution; while subplot 308 illustrates the result from the Gaussian approach. Using Cauchy distribution, the result in subplot 306 again demonstrates a linear decrease in similarity in response to the increasing fraction of difference f from zero to one, which is as expected. In contrast, using Gaussian distribution, the result in subplot 308 demonstrates a highly non-linear decrease in similarity with a linear increase of the fraction f Hence, using Cauchy distribution also improves the performance in this case.

Figure 3C:
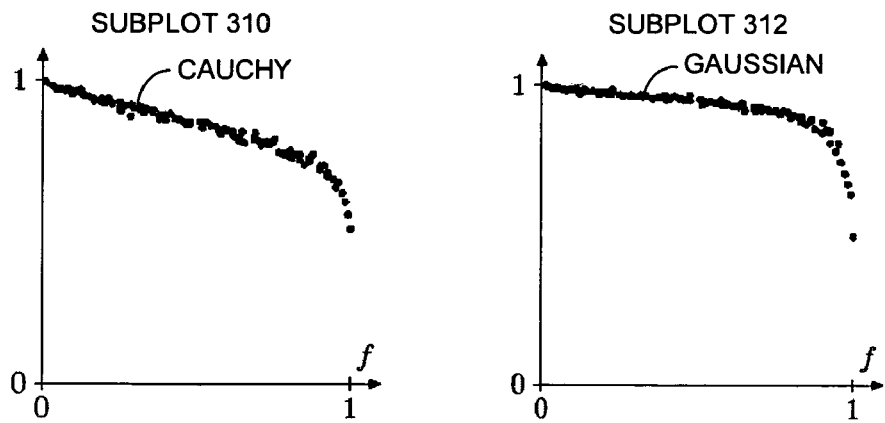
FIG. 3C illustrates the similarity estimation results for S and S', wherein S' is obtained by removing a fraction of the text document S in accordance with an embodiment of the present invention.

FIG. 3C illustrates the similarity estimation results for S and S', wherein S' is obtained by removing a fraction of the text document S in accordance with an embodiment of the present invention. In this example, S' is generated from S by simply removing a fraction f of positions in the set S. Subplot 310 illustrates the result from using Cauchy distribution; while subplot 312 illustrates the result from the Gaussian approach. Note that there is no apparent performance difference between the two plots.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for producing an object signature for an object, wherein the object comprises a set of features, the method comprising:
    initializing a k-dimensional state vector $\{s_1, s_2, \ldots, s_k\}$ containing floating-point numbers;
    for each occurrence of each feature in the object,
        computing a random-number seed from the feature;
        generating k pseudo-random floating-point numbers $\{X_1, X_2, \ldots, X_k\}$ using the random-number seed, wherein each $X_i(i\in[1, k])$ is generated in accordance with an $\alpha$-stable distribution, wherein $1\leq\alpha<2$; and
        updating each floating-point number $s_i$ in the k-dimensional state vector using an associated pseudo-random floating-point number $X_i$; and
    producing the object signature for the object by condensing the k-dimensional state vector, wherein using an $\alpha$-stable distribution with $1\leq\alpha<2$ reduces the influence of multiple occurrences of a given feature on the object signature, wherein the object signature provides an abstract representation for the object with reduced memory requirement;
    storing the object signature in place of the object in a storage device; and
    using the object signature in place of the object during object operations.

2. The computer-implemented method of claim 1, wherein initializing the k-dimensional state vector involves setting each $s_i$ to zero.

3. The computer-implemented method of claim 1, wherein computing the random-number seed from the feature involves hashing the feature to produce the random-number seed.

4. The computer-implemented method of claim 1, wherein generating the k pseudo-random floating-point numbers involves:
    seeding a pseudo-random number generator (PRNG) with the random-number seed; and
    generating the k pseudo-random floating-point numbers from the PRNG.

5. The computer-implemented method of claim 1, wherein the $\alpha$-stable distribution is a Cauchy distribution, wherein $\alpha=1$.

6. The computer-implemented method of claim 1, wherein updating each floating-point number $s_i$ in the k-dimensional state vector using an associated pseudo-random floating-point number $X_i$ involves:
    multiplying each $X_i$ with a predetermined feature weight w, wherein w is associated with the feature; and
    adding the weighted $X_i$ to $s_i$, such that $s_i \leftarrow S_i + wX_i$.

7. The computer-implemented method of claim 1, wherein producing the object signature for the object involves condensing the k-dimensional state vector into a k-bit object signature.

8. The computer-implemented method of claim 7, wherein condensing the k-dimensional state vector into a k-bit object signature involves converting each floating-point number $s_i$ into a single bit, $f_{si}$, within the k-bit object signature such that:
    if $s_i<0$, $f_{si}$ is set to 0; and
    if $s_i>0$, $f_{si}$ is set to 1.

9. The computer-implemented method of claim 1, further comprising comparing the object signatures for a first object and a second object to estimate the similarity between the first object and the second object.

10. A computer-readable storage device storing instructions that when executed by a computer cause the computer to perform a method for producing an object signature for an object, wherein the object comprises a set of features, the method comprising:
    initializing a k-dimensional state vector $\{s_1, s_1, s_k\}$ containing floating-point numbers;
    for each occurrence of each feature in the object,
        computing a random-number seed from the feature;
        generating k pseudo-random floating-point numbers $\{X_1, X_2, \ldots, X_k\}$ using the random-number seed, wherein each $X_i(i\in[1, k])$ is generated in accordance with an $\alpha$-stable distribution, wherein $1\leq\alpha<2$; and
        updating each floating-point number $s_i$ in the k-dimensional state vector using an associated pseudo-random floating-point number $X_i$; and
    producing the object signature for the object by condensing the k-dimensional state vector, wherein using an $\alpha$-stable distribution with $1\leq\alpha<2$ reduces the influence of multiple occurrences of a given feature on the object signature, wherein the object signature provides an abstract representation for the object with reduced memory requirement;
    storing the object signature in place of the object in a storage device; and
    using the object signature in place of the object during object operations.

11. The computer-readable storage device of claim 10, wherein initializing the k-dimensional state vector involves setting each $s_i$ to zero.

12. The computer-readable storage device of claim 10, wherein computing the random-number seed from the feature involves hashing the feature to produce the random-number seed.

13. The computer-readable storage device of claim 10, wherein generating the k pseudo-random floating-point numbers involves:
    seeding a pseudo-random number generator (PRNG) with the random-number seed; and
    generating the k pseudo-random floating-point numbers from the PRNG.

14. The computer-readable storage device of claim 10, wherein the $\alpha$-stable distribution is a Cauchy distribution, wherein $\alpha=1$.

15. The computer-readable storage device of claim 10, wherein updating each floating-point number $s_i$ in the k-dimensional state vector using an associated pseudo-random floating-point number $X_i$ involves:

multiplying each $X_i$ with a predetermined feature weight w, wherein w is associated with the feature; and adding the weighted $X_i$ to $s_i$, such that $s_i \leftarrow s_i + wX_i$.

16. The computer-readable storage device of claim 10, wherein producing the object signature for the object involves condensing the k-dimensional state vector into a k-bit object signature.

17. The computer-readable storage device of claim 16, wherein condensing the k-dimensional state vector into a k-bit object signature involves converting each floating-point number $s_i$ into a single bit, $f_{si}$, within the k-bit object signature such that:

if $s_i < 0$, $f_{si}$ is set to 0; and if $s_i \geq 0$, $f_{si}$ is set to 1.

18. The computer-readable storage device of claim 10, further comprising comparing the object signatures for a first object and a second object to estimate the similarity between the first object and the second object.

19. An apparatus that produces an object signature for an object, wherein the object comprises a set of features, comprising:

an initialization mechanism configured to initialize a k-dimensional state vector $\{s_1, s_1, \ldots, s_k\}$ containing floating-point numbers;

a computing mechanism configured to compute a random-number seed from the feature for each occurrence of each feature in the object;

a generating mechanism configured to generate k pseudo-random floating-point numbers $\{X_1, X_2, \ldots, X_k\}$ using the random-number seed, wherein each $X_i (i \in [1, k])$ is generated in accordance with an $\alpha$-stable distribution, wherein $1 > \alpha < 2$;

an updating mechanism configured to update each floating-point number $s_i$ in the k-dimensional state vector using an associated pseudo-random floating-point number $X_i$; and a producing mechanism configured to produce the object signature for the object by condensing the k-dimensional state vector, wherein using an $\alpha$-stable distribution with $1 > \alpha < 2$ reduces the influence of multiple occurrences of a given feature on the object signature, wherein the object signature provides an abstract representation for the object with reduced memory requirement;

a storage mechanism configured to store the object signature in place of the object in a storage device; and an object operation mechanism configured to use the object signature in place of the object during object operations.

20. The apparatus of claim 19, wherein the initialization mechanism is configured to initialize the k-dimensional state vector by setting each $s_i$ to zero.

21. The apparatus of claim 19, wherein the computing mechanism is configured to compute the random-number seed from the feature by hashing the feature to produce the random-number seed.

22. The apparatus of claim 19, wherein the updating mechanism is configured to:

multiply each $X_i$ with a predetermined feature weight w, wherein w is associated with the feature; and to add the weighted $X_i$ to $s_i$, such that $s_i \leftarrow s_i + wX_i$.

23. The apparatus of claim 19, wherein the producing mechanism is configured to produce the object signature for the object by condensing the k-dimensional state vector into a k-bit object signature.

24. The apparatus of claim 19, further comprising a comparison mechanism configured to compare the object signatures for a first object and a second object to estimate the similarity between the first object and the second object.

* * * * *